United States Patent
Aramaki et al.

(10) Patent No.: US 11,888,990 B2
(45) Date of Patent: Jan. 30, 2024

(54) INFORMATION PROCESSING DEVICE CONTROLLING ANALYSIS OF A PROGRAM BEING EXECUTED BASED ON A RESULT OF VERIFICATION OF AN ANALYSIS PROGRAM

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yasuto Aramaki, Kawasaki Kanagawa (JP); Susumu Yasuda, Koto Tokyo (JP); Tatsuaki Iwata, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 470 days.

(21) Appl. No.: 17/002,968

(22) Filed: Aug. 26, 2020

(65) Prior Publication Data
US 2021/0281423 A1    Sep. 9, 2021

(30) Foreign Application Priority Data
Mar. 9, 2020    (JP) .................. 2020-040206

(51) Int. Cl.
*H04L 9/32*    (2006.01)
*G06F 21/52*    (2013.01)
(Continued)

(52) U.S. Cl.
CPC ............ *H04L 9/3247* (2013.01); *G06F 21/52* (2013.01); *G06F 21/64* (2013.01);
(Continued)

(58) Field of Classification Search
CPC . H04L 9/3247; H04L 9/32; H04L 9/08; H04L 9/083; G06F 21/52; G06F 21/64;
(Continued)

(56) References Cited

U.S. PATENT DOCUMENTS 4,912,628 A * 3/1990 Briggs .................. G06F 9/4843
718/107
5,063,498 A * 11/1991 Hirahara ................. G06F 13/32
710/50
(Continued)

FOREIGN PATENT DOCUMENTS

CN        101606164 A * 12/2009 ............. G06F 21/51
EP        2975546 B1 *  6/2018 ............. G06F 21/52
(Continued)

OTHER PUBLICATIONS

Static Analysis of Runtime Errors in Interrupt-Driven Programs via Sequentialization by Xueguang Wu; Liqian Chen; Antoine Min'e; Wei Dong and Ji Wang pp. 26; Aug. 2016.*
(Continued)

*Primary Examiner* — Eleni A Shiferaw
*Assistant Examiner* — Ali H. Cheema
(74) *Attorney, Agent, or Firm* — Holtz, Holtz & Volek PC

(57) ABSTRACT

An information processing device of one embodiment includes a first memory being volatile, a second memory being non-rewritable and nonvolatile, and a processor. A first program, a second program, and a digital signature for the second program are loaded into the first memory. A third program and a public key are stored in the second memory. Upon satisfaction of a certain condition during execution of the first program, the processor verifies the second program on the basis of the digital signature and the public key, in accordance with the third program. After finding a result of the verification as a pass, the processor analyzes the first (Continued)

program in accordance with the second program. The processor refrains from analyzing the first program after finding the result of the verification as a fail.

17 Claims, 7 Drawing Sheets

(51) Int. Cl.
    *G06F 21/64*     (2013.01)
    *H04L 9/40*     (2022.01)
    *G06F 21/57*     (2013.01)

(52) U.S. Cl.
    CPC ........ H04L 63/0823 (2013.01); *G06F 21/577* (2013.01); *G06F 2221/033* (2013.01)

(58) Field of Classification Search
    CPC .. G06F 21/577; G06F 21/575; G06F 21/6218; G06F 21/78; G06F 21/72; G06F 2221/033; G06F 11/0772; G06F 11/1417; G06F 11/1666; G09C 1/00
    USPC .......................................... 713/176; 726/2, 4
    See application file for complete search history.

(56) References Cited

U.S. PATENT DOCUMENTS

| | | | | |
|---|---|---|---|---|
| 5,349,680 A * | 9/1994 | Fukuoka | ................ | G06F 9/463 712/228 |
| 5,659,759 A * | 8/1997 | Yamada | ................ | G06F 13/26 710/265 |
| 6,038,631 A * | 3/2000 | Suzuki | ................ | G06F 12/08 710/262 |
| 6,070,220 A * | 5/2000 | Katayama | ............ | G06F 9/4812 710/262 |
| 6,158,023 A | 12/2000 | Ubukata et al. | | |
| 6,553,513 B1 * | 4/2003 | Swoboda | ............ | G06F 11/3656 714/28 |
| 6,775,778 B1 * | 8/2004 | Laczko, Sr. | ............. | G06F 21/51 726/2 |
| 7,043,641 B1 * | 5/2006 | Martinek | .............. | G07F 17/323 713/176 |
| 7,865,733 B2 | 1/2011 | Goto et al. | | |
| 8,453,206 B2 | 5/2013 | Haga et al. | | |
| 8,880,284 B2 | 11/2014 | Yamauchi | | |
| 9,392,017 B2 * | 7/2016 | Cui | ....... | H04L 63/145 |
| 9,454,461 B1 * | 9/2016 | Bates | ....................... | G06F 8/70 |
| 11,048,778 B2 * | 6/2021 | Yamamura | ........... | G06F 21/629 |
| 2002/0027907 A1 * | 3/2002 | Tateoka | ............. | H04L 63/0236 370/389 |
| 2002/0144053 A1 * | 10/2002 | Yada | .................... | G06F 3/0605 712/E9.083 |
| 2003/0172215 A1 * | 9/2003 | Franke | ................. | G06F 9/4812 710/264 |
| 2005/0132217 A1 * | 6/2005 | Srinivasan | ............. | G06F 21/73 726/22 |
| 2005/0166069 A1 * | 7/2005 | Hashimoto | ............. | G06F 21/10 713/194 |
| 2005/0273757 A1 * | 12/2005 | Anderson | ................ | G06F 8/75 717/100 |
| 2008/0204920 A1 * | 8/2008 | Muramatsu | .......... | G11B 17/228 |
| 2009/0199049 A1 * | 8/2009 | Yorimitsu | ............ | G06F 11/141 714/E11.067 |
| 2011/0188154 A1 * | 8/2011 | Chokki | ................. | G11B 5/596 360/77.02 |
| 2011/0213987 A1 * | 9/2011 | Kuzuhara | ............... | G06F 21/80 713/189 |
| 2011/0292538 A1 * | 12/2011 | Haga | .................... | G01R 33/093 360/60 |
| 2011/0296204 A1 * | 12/2011 | Henry | .................. | H04L 9/0827 713/190 |
| 2012/0192170 A1 * | 7/2012 | Kobayashi | ................ | G06F 8/65 717/168 |
| 2012/0300341 A1 * | 11/2012 | Matsuo | ............. | G11B 5/59627 360/77.02 |
| 2013/0124843 A1 * | 5/2013 | Bobzin | ................. | G06F 21/575 713/2 |
| 2013/0190946 A1 | 7/2013 | Yamauchi | | |
| 2014/0123234 A1 * | 5/2014 | Sugaya | ................... | G06F 9/485 726/4 |
| 2014/0258726 A1 * | 9/2014 | Fukuda | ................. | H04L 9/0877 713/172 |
| 2014/0298026 A1 * | 10/2014 | Isozaki | ................. | H04L 9/0825 713/171 |
| 2015/0046717 A1 | 2/2015 | Hagiwara et al. | | |
| 2016/0055331 A1 * | 2/2016 | Szczeszynski | ......... | G06F 21/14 726/22 |
| 2018/0165451 A1 * | 6/2018 | Kawakita | ............ | G06F 9/45558 |
| 2020/0104211 A1 * | 4/2020 | Obayashi | ............ | G06F 11/0772 |
| 2020/0134232 A1 * | 4/2020 | Nomura | ................. | G06F 21/64 |
| 2021/0281423 A1 * | 9/2021 | Aramaki | ............. | H04L 63/0823 |

FOREIGN PATENT DOCUMENTS

| | | | | |
|---|---|---|---|---|
| JP | H10333939 A | 12/1998 | | |
| JP | 2004171416 A * | 6/2004 | ............ | G06Q 30/06 |
| JP | 3873603 B2 * | 1/2007 | ............ | G06F 21/64 |
| JP | 2007066259 A * | 3/2007 | ............ | G06F 16/10 |
| JP | 2007183844 A * | 7/2007 | ....... | G11B 20/10527 |
| JP | 2009009372 A | 1/2009 | | |
| JP | 4447977 B2 | 1/2010 | | |
| JP | 4814993 B2 | 9/2011 | | |
| JP | 2011253610 A * | 12/2011 | ....... | G11B 20/10305 |
| JP | 5049288 B2 | 7/2012 | | |
| JP | 2013069053 A * | 4/2013 | .......... | H04L 9/3247 |
| JP | 2015036847 A | 2/2015 | | |
| JP | 5796447 B2 * | 10/2015 | .......... | G06F 21/575 |
| JP | 2017033248 A | 2/2017 | | |
| JP | 2018195329 A | 12/2018 | | |
| JP | 2020095470 A * | 6/2020 | | |
| JP | 2020181540 A * | 11/2020 | ............... | H04L 9/30 |
| KR | 20140019402 A * | 2/2014 | ............. | G06F 21/73 |
| KR | 20150045037 A * | 4/2015 | ............. | G06F 21/30 |
| KR | 20150045053 A * | 4/2015 | | |
| KR | 20150099697 A * | 9/2015 | | |
| KR | 102029045 B1 * | 10/2019 | ............... | H04L 9/32 |
| KR | 20200063535 A * | 6/2020 | ............. | G06F 21/51 |
| TW | 201312575 A * | 3/2013 | .......... | G06F 21/577 |
| WO | 2012049750 A1 | 4/2012 | | |
| WO | WO-2013161974 A1 * | 10/2013 | ............. | G06F 21/64 |
| WO | WO-2019128673 A1 * | 7/2019 | ............. | G06F 11/07 |

OTHER PUBLICATIONS

U.S. Appl. No. 16/798,478; First Named Inventor: Yasuto Aramaki; Title: "Data Transfer Control Device, Data Transfer Control System, and Data Transfer Control Method", filed Feb. 24 2020.

\* cited by examiner

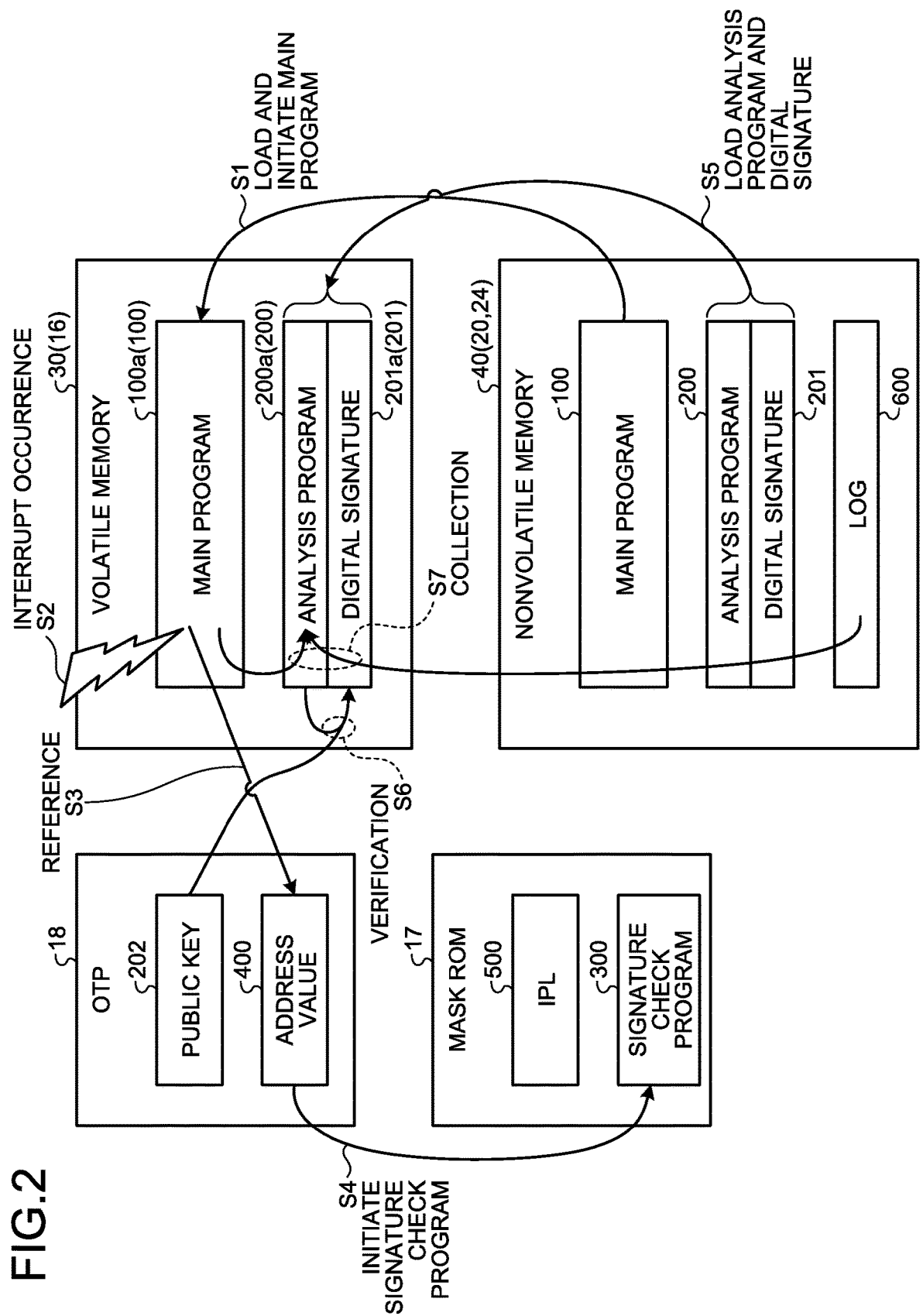

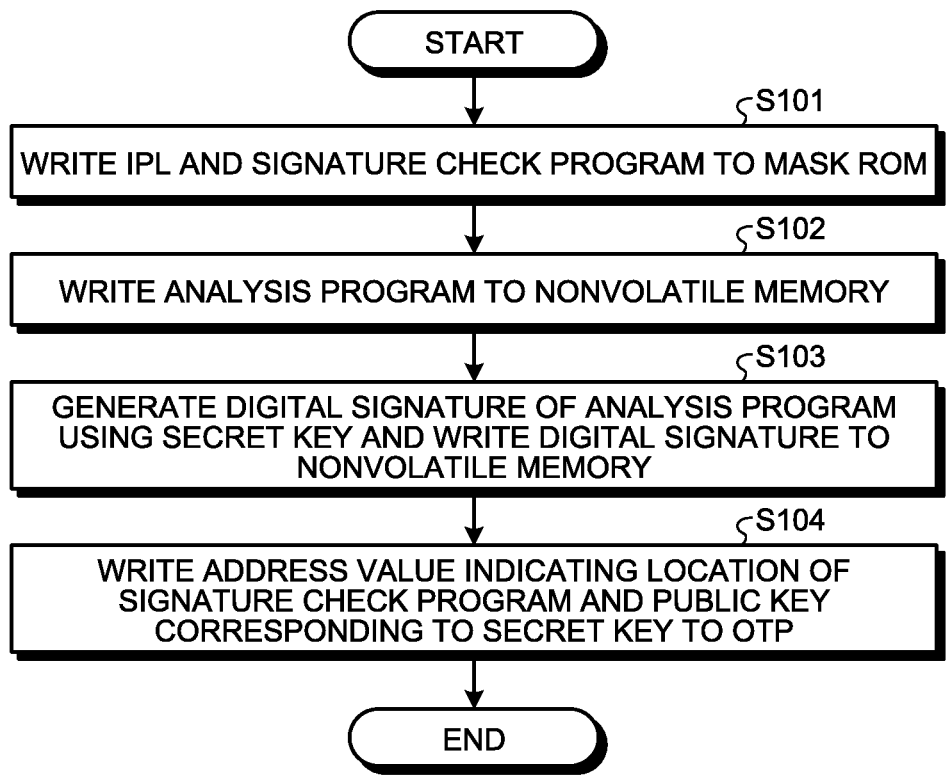
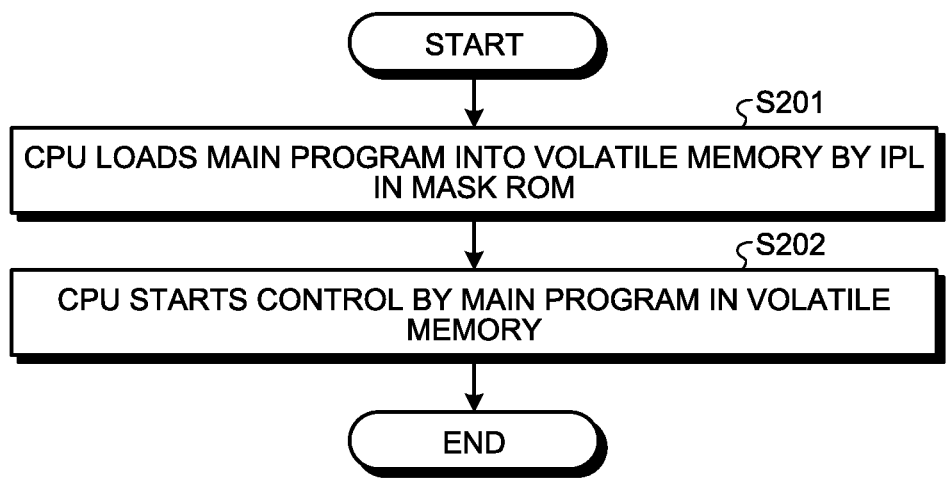

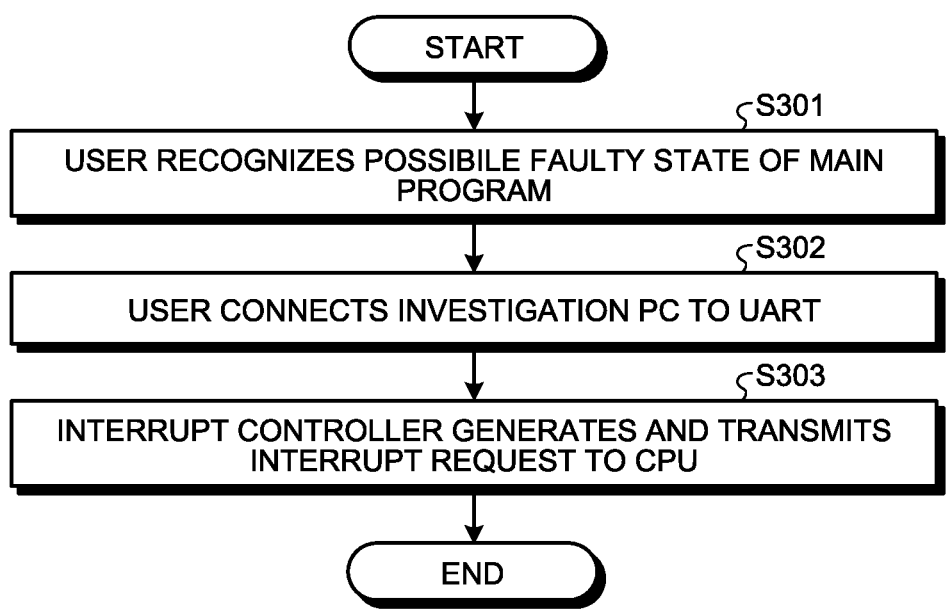

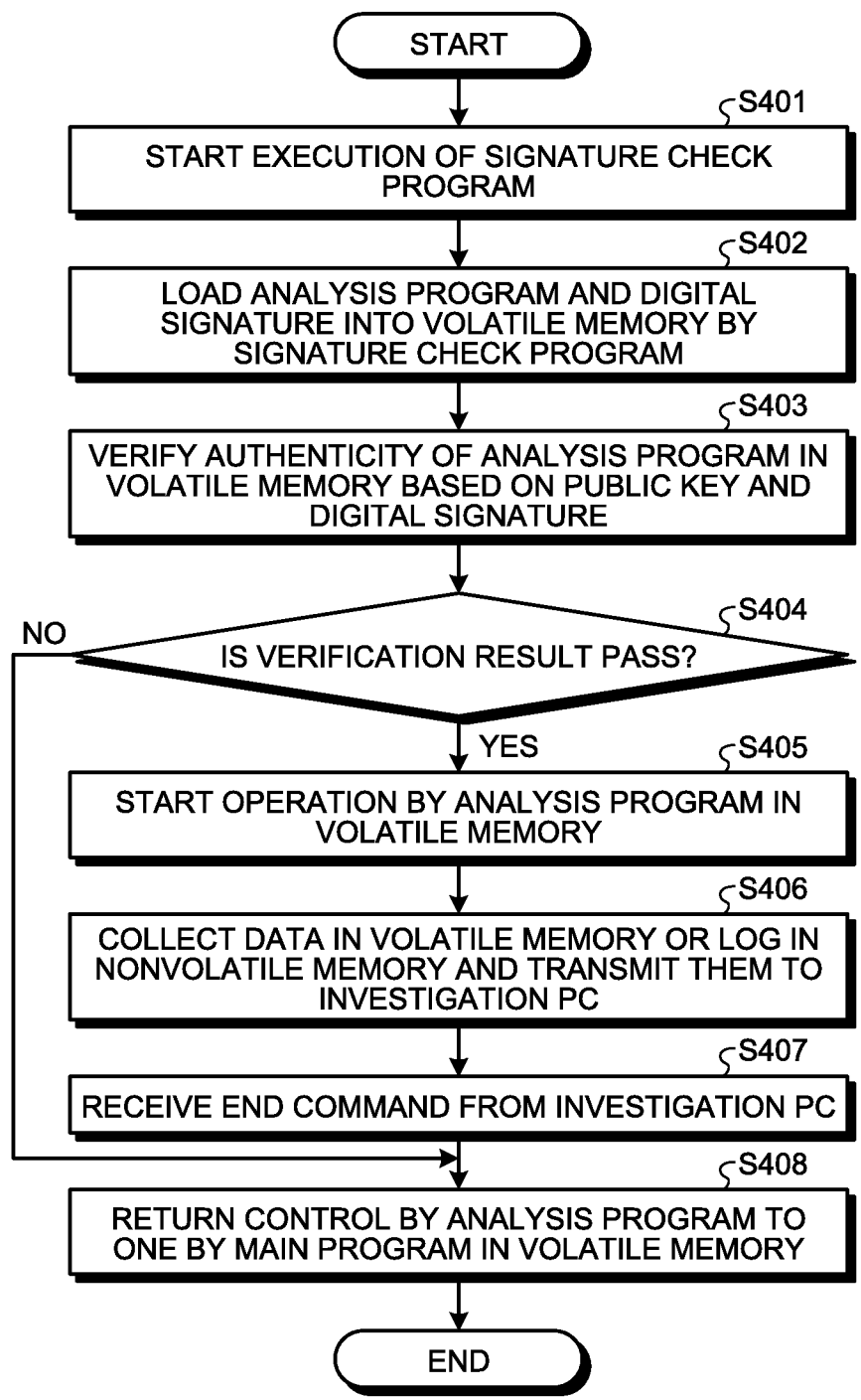

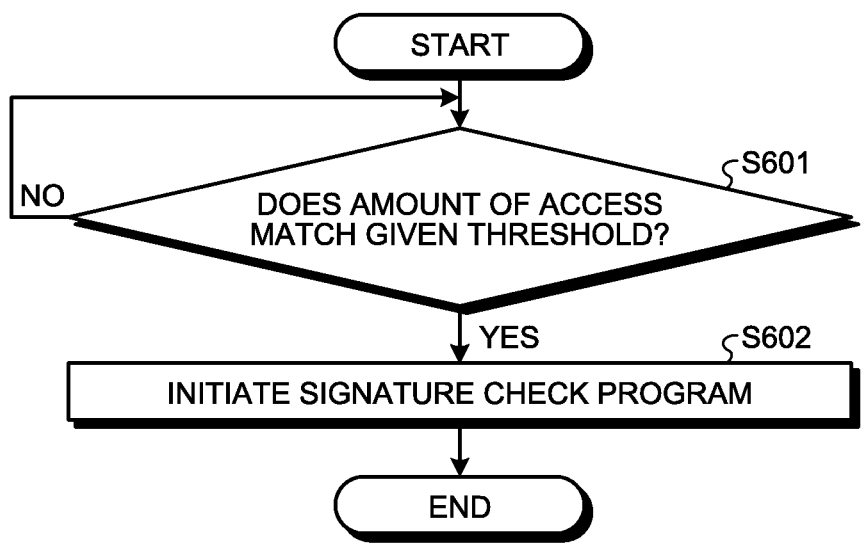

INFORMATION PROCESSING DEVICE CONTROLLING ANALYSIS OF A PROGRAM BEING EXECUTED BASED ON A RESULT OF VERIFICATION OF AN ANALYSIS PROGRAM

CROSS-REFERENCE TO RELATED APPLICATIONS

This application is based upon and claims the benefit of priority from Japanese Patent Application No. 2020-040206, filed on Mar. 9, 2020; the entire contents of which are incorporated herein by reference.

FIELD

Embodiments described herein relate generally to an information processing device.

BACKGROUND

Traditionally, there are information processing devices that operate by computer programs. A computer program (hereinafter, referred to as a program) may run into a runaway or infinite loop state that it faces difficulty in implementing a normal operation. This state is referred to as a faulty state. The faulty state may be caused by an internal factor such as a program bug or by an external factor such as faulty hardware or partial destruction of a memory containing the program.

To deal with a faulty state of a program serving to control the main operation of the information processing device, the information processing device may initiate a dedicated analysis program in response to an interrupt. The information processing device can collect logs accumulated inside or collect data from a memory included in the information processing device, in accordance with the analysis program.

However, the analysis program may possibly be altered or tampered with, or damaged. In addition, falsification of a vector table for indicating the location of the analysis program, if it occurs, may result in initiating an unauthorized program such as the one for compromising the information processing device instead of the analysis program. In such cases, it is difficult for the analysis program to implement expected intrinsic operation. In other words, it is difficult to securely analyze the program.

BRIEF DESCRIPTION OF THE DRAWINGS

FIG. 2 is a schematic diagram illustrating some features of the magnetic disk device to which the information processing device of the embodiment is applied;

FIG. 3 is a flowchart illustrating exemplary processing by a manufacturer during manufacture of the magnetic disk device to which the information processing device of the embodiment is applied;

FIG. 4 is a flowchart illustrating an exemplary operation of the magnetic disk device to which the information processing device of the embodiment is applied, at the time of power-on;

FIG. 5 is a flowchart illustrating an exemplary interrupt request generation by the magnetic disk device to which the information processing device of the embodiment is applied;

FIG. 6 is a flowchart illustrating an exemplary operation of the magnetic disk device to which the information processing device of the embodiment is applied, after generating the interrupt request;

FIG. 9 is a flowchart illustrating another initiation method according to a second modification of the embodiment.

DETAILED DESCRIPTION

According to one embodiment, in general, an information processing device includes a first memory being volatile, a second memory being non-rewritable and nonvolatile, and a processor. A first program, a second program, and a digital signature for the second program are loaded into the first memory. A third program and a public key are stored in the second memory. Upon satisfaction of a certain condition during execution of the first program, the processor verifies the second program on the basis of the digital signature and the public key, in accordance with the third program. After finding a result of the verification as a pass, the processor analyzes the first program in accordance with the second program. The processor refrains from analyzing the first program after finding the result of the verification as a fail.

Hereinafter, a magnetic disk device to which an information processing device according to an embodiment is applied will be described by way of example. A device to which the information processing device of the embodiment is applicable is not limited to the magnetic disk device. The information processing device of the embodiment is applicable to any device including a memory that stores a computer program and a processor that executes the computer program. The following will describe the magnetic disk device to which the information processing device of the embodiment is applied in detail with reference to the accompanying drawings. The following embodiment is presented for illustrative purpose only and not intended to limit the scope of the present invention.

Embodiment

Figure 1:
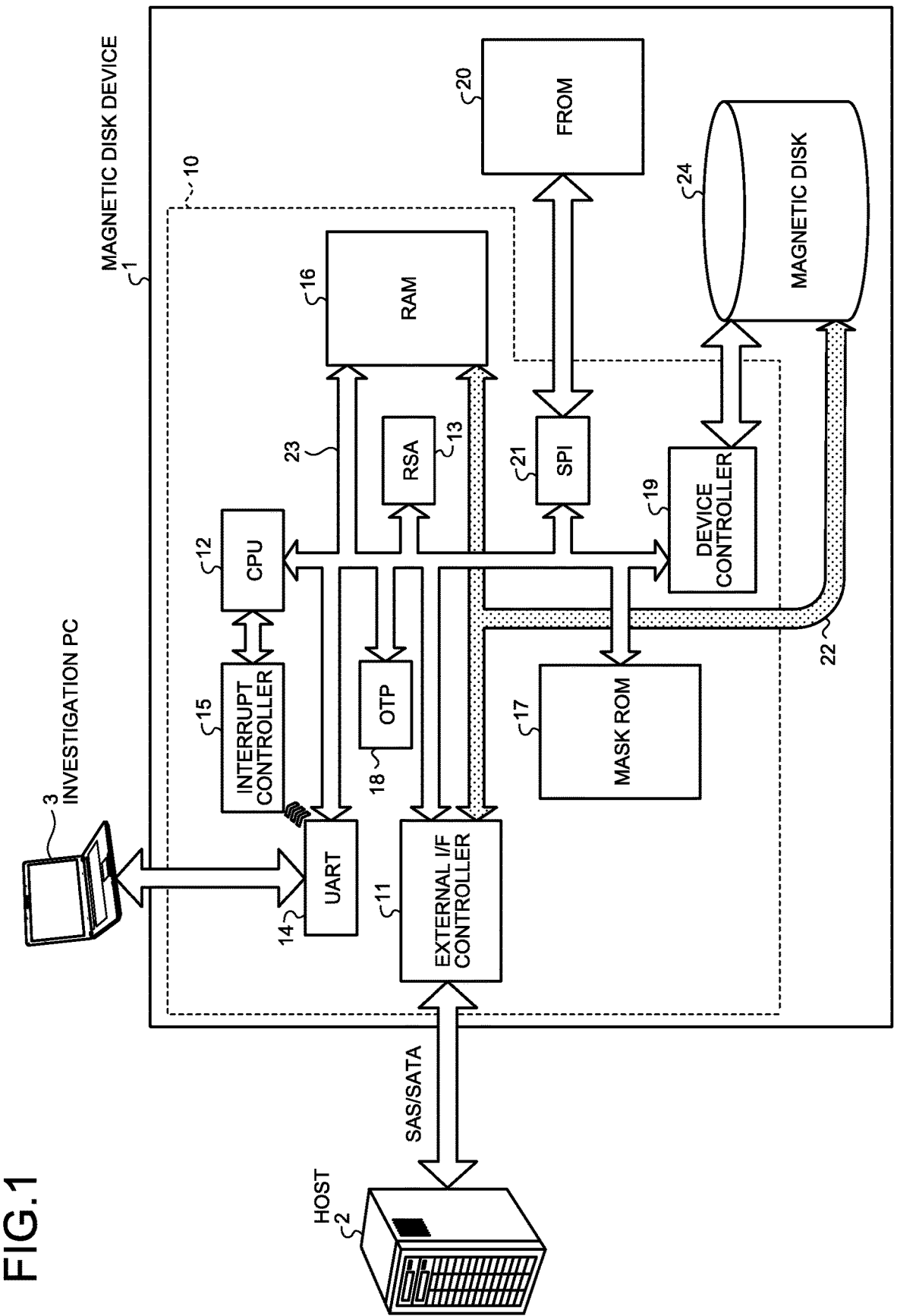
FIG. 1 is a schematic diagram illustrating an exemplary hardware configuration of a magnetic disk device to which an information processing device according to an embodiment is applied.

FIG. 1 is a schematic diagram illustrating an exemplary hardware configuration of a magnetic disk device to which an information processing device of an embodiment is applied. A magnetic disk device 1 is connected to a host 2 serving as, for example, a server. The magnetic disk device 1 functions as a storage that stores data from the host 2. The host 2 is not limited to the server.

The host 2 and the magnetic disk device 1 are connected to each other through an interface conforming to a given standard. The interface is, for example, a serial attached small computer system interface (SAS) or a serial advanced technology attachment (SATA). The standard to which the connecting interface conforms is not limited thereto.

The magnetic disk device 1 includes an external interface (I/F) controller 11, a central processing unit (CPU) 12, a Rivest-Shamir-Adleman cryptosystem (RSA) circuit 13, a universal asynchronous receiver/transmitter (UART) 14, an interrupt controller 15, a random access memory (RAM) 16, a mask read only memory (ROM) 17, a one-time programmable (OTP) 18, a device controller 19, a flash read only memory (FROM) 20, a serial peripheral interface (SPI) 21, a first bus 22, a second bus 23, and a magnetic disk 24.

The magnetic disk 24 includes, on the surface, a magnetic material capable of storing data. The magnetic disk 24 is, for example, provided with a plurality of concentric tracks at given pitches in a radial direction. Each track includes a large number of continuous sectors on the circumference. Each sector is data rewritable freely. The tracks each including the large number of sectors constitute the recording surface on which data can be recorded. That is, the magnetic disk 24 represents a large-capacity rewritable nonvolatile memory.

FIG. 1 omits depicting a magnetic head that writes and reads data to and from the magnetic disk 24, an actuator arm that supports the magnetic head, a voice coil motor that drives the actuator arm, and a spindle motor that rotates the magnetic disk 24.

The external I/F controller 11, the CPU 12, the RSA circuit 13, the UART 14, the interrupt controller 15, the RAM 16, the mask ROM 17, the OTP 18, the device controller 19, and the SPI 21 are mounted on, for example, a controller board 10. Elements mounted on the controller board 10 are not limited thereto.

The first bus 22 is used in transferring data, that is, user data, sent from the host 2. The second bus 23 is used in transferring commands, signals, and information for access control over the magnetic disk 24 in response to a request from the host 2.

The external I/F controller 11, the RAM 16, and the magnetic disk 24 are connected to the first bus 22. The CPU 12, the UART 14, the OTP 18, the RSA circuit 13, the RAM 16, the mask ROM 17, the SPI 21, and the device controller 19 are connected to the second bus 23.

The external I/F controller 11 serves as an interface device that communicates with the host 2. The external I/F controller 11 can receive and transfer the request from the host 2 to the CPU 12. The external I/F controller 11 can buffer the user data sent from the host 2 in the RAM 16. The external I/F controller 11 can transfer user data, read from the magnetic disk 24 to the RAM 16, to the host 2. The external I/F controller 11 corresponds to a first interface of an embodiment.

The CPU 12 serves as a processor that can execute various programs. The CPU 12 implements functions according to the programs. The RSA circuit 13 decrypts encrypted data by an RSA, which is one of public key cryptosystems. In the embodiment, the RSA circuit 13 is used for verification with a digital signature. The UART 14 serves as an interface device to which an external computer is connectable. The UART 14 corresponds to a second interface of an embodiment.

The interrupt controller 15 generates an interrupt request in response to occurrence of a certain event. The interrupt controller 15 notifies the CPU 12 of the interrupt request.

In the embodiment, the interrupt controller 15 generates the interrupt request after detecting connection of an investigation personal computer (PC) 3 to the UART 14. The investigation PC 3 represents a computer that analyzes programs.

The system by which the interrupt controller 15 detects connection of the investigation personal computer (PC) 3 to the UART 14 can be optionally configured. As one example, the interrupt controller 15 detects the connection between the investigation PC 3 and the UART 14 from electrification therebetween. As another example, the interrupt controller 15 detects the connection between the investigation PC 3 and the UART 14 from start of command transmission and reception therebetween.

The RAM 16 is a volatile memory. The RAM 16 provides the CPU 12 with an area to which various programs are loaded. The RAM 16 also functions as a buffer for the user data transferred between the host 2 and the magnetic disk 24. The RAM 16 may include a dynamic random access memory (DRAM), a static random access memory (SRAM), or a combination thereof. Memories constituting the RAM 16 are not limited thereto.

The mask ROM 17 is a non-rewritable nonvolatile memory. The contents of the mask ROM 17 are fixed during manufacture of the hardware of the magnetic disk device 1 in a factory.

The OTP 18 is an only one-time writable, nonvolatile memory and does not allow data update. The contents of the OTP 18 may be fixed after manufacture of the hardware of the magnetic disk device 1.

The device controller 19 can access the magnetic disk 24 via the magnetic head, that is, write and read data thereto and therefrom. The device controller 19 may also be referred to as a read/write channel. The device controller 19 can write the user data buffered in the RAM 16 to the magnetic disk 24. In addition, the device controller 19 can send the user data read from the magnetic disk 24 to the RAM 16.

The FROM 20 is a rewritable nonvolatile memory. The SPI 21 is an interface device for accessing the FROM 20 through serial communication.

The CPU 12 and the RSA circuit 13 correspond to a processor of an embodiment. However, the RSA circuit 13 may not be included in the processor. The RAM 16 corresponds to a first memory of an embodiment. The mask ROM 17 and the OTP 18 correspond to a second memory of an embodiment. The FROM 20 or the magnetic disk 24 corresponds to a third memory of an embodiment. The mask ROM 17 of the second memory corresponds to a fourth memory of an embodiment. The OTP 18 of the second memory corresponds to a fifth memory of an embodiment.

FIG. 2 is a schematic diagram illustrating some features of the magnetic disk device 1 to which the information processing device of the embodiment is applied. A volatile memory 30 corresponds to the RAM 16. The nonvolatile memory 40 corresponds to the FROM 20 or the magnetic disk 24.

A main program 100, an analysis program 200, and a digital signature 201 of the analysis program 200 are stored in advance in the nonvolatile memory 40.

The main program 100 serves to control the main operation of the magnetic disk device 1. That is, the main program 100 represents firmware that causes the CPU 12 to execute access control over the magnetic disk 24 in response to a request from the host 2. The analysis program 200 serves to cause the CPU 12 to analyze the main program 100. The digital signature 201 represents data generated by encoding or encrypting the analysis program 200 with a secret key. The encryption is based on an RSA method.

The main program 100, the analysis program 200, and the digital signature 201 are loaded into the volatile memory 30. Hereinafter, the main program, the analysis program, and the digital signature loaded into the volatile memory 30 will be referred to as a main program 100a, an analysis program 200a, and a digital signature 201a, respectively. The CPU 12 implements access control over the magnetic disk 24 by the main program 100a, in response to a request from the host 2. The CPU 12 analyzes the main program 100a by the analysis program 200a.

An initial program loader (IPL) 500 and a signature check program 300 are written in advance to the mask ROM 17.

The IPL 500 serves as a program for loading the main program 100 from the nonvolatile memory 40 into the volatile memory 30 at the time of power-on of the magnetic disk device 1.

The signature check program 300 mainly causes the CPU 12 to execute two operations. In a first operation, the CPU 12 loads the analysis program 200 and the digital signature 201 from the nonvolatile memory 40 into the volatile memory 30. In a second operation, the CPU 12 verifies authenticity of the analysis program 200a on the basis of the digital signature 201a and a public key 202.

The public key 202 and an address value 400 indicating the location of the signature check program 300 are written in advance to the OTP 18.

The CPU 12 loads the main program 100 from the nonvolatile memory 40 into the volatile memory 30 by the IPL 500 at the time of power-on of the magnetic disk device 1, and initiates the main program 100a (S1).

The CPU 12 can record information a log 600, representing information indicative of an operating status, in the nonvolatile memory 40 during execution of the main program 100a when appropriate. The information indicative of the operating status may include, for example, environmental temperature, vibration affecting the magnetic disk device 1, the number of times of power-on, power-on time, and the number of errors occurred.

While the CPU 12 is executing the main program 100a, the main program 100a may run into a faulty state due to an internal factor or an external factor. After recognizing a possible faulty state of the main program 100a, the user can connect the investigation PC 3 to the magnetic disk device 1 in order to analyze the main program 100a. The investigation PC 3 may be connected to the UART 14 while the magnetic disk device 1 is connected to the host 2 and electrified.

After detecting the connection of the investigation PC 3 to the UART 14, the interrupt controller 15 generates an interrupt request and sends the interrupt request to the CPU 12 (S2). The CPU 12 receives the interrupt request and identifies the location of the signature check program 300, referring to the address value 400 (S3). The CPU 12 initiates the signature check program 300 (S4).

In S3 and S4, an address value indicating a storage location of a next command to a currently executed command by the main program 100a is saved in a location indicated by a stack pointer. The value of a general-purpose register is also saved. The address value 400 is then set to a program counter, thereby shifting the control by the main program 100a to the control by the signature check program 300. The main program 100a is maintained in a suspended state.

Subsequently, the CPU 12 loads the analysis program 200 and the digital signature 201 from the nonvolatile memory 40 into the volatile memory 30, in accordance with the signature check program 300 (S5). The CPU 12 verifies the authenticity of the analysis program 200a on the basis of the public key 202 and the digital signature 201a, in accordance with the signature check program 300 (S6).

In the operation of S6, the CPU 12 instructs the RSA circuit 13 to verify the analysis program 200a, and the RSA circuit 13 conducts the verification. Alternatively, the CPU 12 may execute the entire operation of S6.

The digital signature 201 is generated by encoding a hash value of the analysis program 200 with a secret key. In S6, the processor, i.e., CPU 12 or RSA circuit 13, restores a hash value by decoding the digital signature 201a with the public key 202, and calculates the hash value of the analysis program 200a.

As long as the public key 202 matches with the secret key used in encoding, and the analysis program 200a and the digital signature 201a are both normal, the hash value obtained by decoding and the hash value obtained from the analysis program 200a coincide with each other. Thus, the analysis program 200a is determined to be authentic. That is, a result of the verification is found to be a pass.

Normalcy of the analysis program 200a signifies that the analysis program 200a has not been subjected to falsification or tampering, or destruction. Anomaly of the analysis program 200a signifies that the analysis program 200a has been subjected to falsification or tampering, or destruction.

If the public key 202 does not match with the secret key or the analysis program 200a or the digital signature 201a is non-normal, their hash values are different from each other. Thus, the analysis program 200a is determined to be not authentic. That is, a result of the verification is found to be a fail.

With the result of the verification found as a pass, the CPU 12 implements an analysis operation under the control of the analysis program 200a. Specifically, the CPU 12 can collect the log 600 from the nonvolatile memory 40 or the contents of the volatile memory 30, i.e., part or all of the main program 100a, in accordance with a command from the investigation PC 3 (S7).

During the analysis, the main program 100a is maintained in a suspended state, starting from occurrence of the interrupt. Thus, if the main program 100a has been tampered with or destroyed, the CPU 12 can collect information on the tampered or destroyed location.

The CPU 12 can transmit the collected information to the investigation PC 3 in response to a command from the investigation PC 3. The CPU 12 ends the analysis in accordance with the analysis program 200a upon receiving an end command from the investigation PC 3 via the UART 14.

Processing after the completion of the analysis may be optionally configured. As one example, the CPU 12 may return to controlling by the main program 100a from by the analysis program 200a. Specifically, a previously saved address value is set to the program counter. In addition, the saved value of the general-purpose register is also returned. Thereby, the CPU 12 returns to controlling by the main program 100a from by the analysis program 200a. For another example, the user may power off the magnetic disk device 1 by shutting off power supply to the magnetic disk device 1.

With the result of the verification found to be a fail, the CPU 12 refrains from executing an operation in accordance with the analysis program 200a. As one example, the CPU 12 returns the control by the signature check program 300 to the one by the main program 100a. Alternatively, the CPU 12 may notify the investigation PC 3 of anomaly in the analysis program 200a in accordance with the signature check program 300. After recognizing the notification, the user may power off the magnetic disk device 1 by shutting off power supply to the magnetic disk device 1.

According to the embodiment as described above, in response to occurrence of an interrupt, the CPU 12 verifies the authenticity of the analysis program 200a using the digital signature 201a. After finding the result of the verification as a pass, the CPU 12 executes the analysis program 200a. After finding the result of the verification as a fail, the CPU 12 refrains from executing the analysis program 200a.

Thus, the CPU 12 can proceed to analyzing the main program 100a after finding the analysis program 200a to be normal.

The non-rewritable mask ROM 17 or the OTP 18 contains the signature check program 300 and the public key 202 for use in the verification. This makes it impossible to alter or tamper with the signature check program 300 or the public key 202. Thus, secure verification of the analysis program 200a is enabled.

For the two reasons as above, the CPU 12 according to the embodiment can securely analyze the main program 100a.

The main program 100 or 101a corresponds to a first program according to the embodiment. The analysis program 200 or 200a corresponds to a second program according to the embodiment. The signature check program 300 corresponds to a third program according to the embodiment.

Next, an exemplary operation of the magnetic disk device 1 serving as the information processing device of the embodiment will be described in detail. FIG. 3 is a flowchart illustrating an exemplary process by a manufacturer during manufacture of the magnetic disk device 1 to which the information processing device of the embodiment is applied.

First, the manufacturer writes the IPL 500 and the signature check program 300 to the mask ROM 17 (S101). The manufacturer then writes the analysis program 200 to the nonvolatile memory 40 (S102). In addition, the manufacturer generates the digital signature 201 using a given secret key and writes the digital signature 201 to the nonvolatile memory 40 (S103).

Subsequently, the manufacturer writes, to the OTP 18, the address value 400 indicating the location of the signature check program 300 and the public key 202 matching with the given secret key (S104).

The mask ROM 17 contains the IPL 500 and the signature check program 300, so that the operation of S101 is performed during manufacture of the hardware of the magnetic disk device 1.

Meanwhile, the OTP 18 contains the address value 400 and the public key 202, and the nonvolatile memory 40 contains the analysis program 200 and the digital signature 201. Thus, the operations of S102 to S104 are performed after manufacture of the hardware.

That is, the signature check program 300 may be written to the corresponding memory during manufacture of the hardware while the public key 202, the analysis program 200, and the digital signature 201 may be written to the corresponding memories after manufacture of the hardware. In the case of manufacturing a large number of magnetic disk devices 1, it is thus made possible to share the signature check program 300 by all the magnetic disk devices 1 and set different combinations of public keys 202 and digital signatures 201 for the respective magnetic disk devices. Needless to say that all the magnetic disk devices 1 can adopt the common combination of the public key 202 and the digital signature 201.

FIG. 4 is a flowchart illustrating an exemplary operation at the time of power-on of the magnetic disk device 1 to which the information processing device of the embodiment is applied.

At the time of power-on of the magnetic disk device 1, the CPU 12 loads the main program 100 from the nonvolatile memory 40 into the volatile memory 30 in accordance with the IPL 500 (S201). The CPU 12 starts control of the magnetic disk device 1, in accordance with the main program 100a (S202). That is, the CPU 12 starts access control over the magnetic disk 24 in response to a request from the host 2.

FIG. 5 is a flowchart illustrating an exemplary interrupt-request generation of the magnetic disk device 1 to which the information processing device of the embodiment is applied.

After recognizing a possible faulty state of the main program 100a from different behavior of the magnetic disk device 1 from its typical behavior (S301), for example, the user connects the investigation PC 3 to the UART 14 (S302). The interrupt controller 15 generates an interrupt request after detecting connection of the investigation PC 3 to the UART 14, and transmits the interrupt request to the CPU 12 (S303).

FIG. 6 is a flowchart illustrating an exemplary operation of the magnetic disk device 1 to which the information processing device of the embodiment is applied, after generation of an interrupt request.

Receiving the interrupt request, the CPU 12 loads the signature check program 300 from the location indicated by the address value 400 and starts execution of the signature check program 300 (S401).

Subsequently, the CPU 12 loads the analysis program 200 and the digital signature 201 from the nonvolatile memory 40 into the volatile memory 30, in accordance with the signature check program 300 (S402).

The CPU 12 verifies the authenticity of the analysis program 200a on the basis of the public key 202 and the digital signature 201a (S403). In S403, the CPU 12 may independently verify the authenticity of the analysis program 200a or may cause the RSA circuit 13 to verify the authenticity of the analysis program 200a.

With the result of the verification found to be a pass (Yes in S404), the CPU 12 starts operation by the analysis program 200a (S405). Then, as part of the operation by the analysis program 200a, the CPU 12 collects the contents (for example, part or all of the main program 100a) in the volatile memory 30 or the logs in the nonvolatile memory 40 and transmits them to the investigation PC 3, in response to a command from the investigation PC 3 (S406).

The user can collect necessary information through the investigation PC 3, and can transmit an end command from the investigation PC 3 to the magnetic disk device 1 after completion of the analysis. After the magnetic disk device 1 receives the end command (S407), the CPU 12 returns to controlling by the main program 100a from by the analysis program 200a (S408), completing the operation.

With the result of the verification found to be a fail (No in S404), the CPU 12 executes the operation of S408. The operations of the CPU 12 in response to a fail of the result of the verification and after receipt of the end command are not limited to the example described in FIG. 6. For example, the CPU 12 may notify the investigation PC 3 of anomaly in the analysis program 200a, in accordance with the signature check program 300. The user may power off the magnetic disk device 1 by shutting off power supply to the magnetic disk device 1 upon recognizing the notification.

By power-off of the magnetic disk device 1, the main program 100a, the analysis program 200a, and the digital signature 201a are lost from the volatile memory 30. Upon next power-on of the magnetic disk device 1, the CPU 12 executes the operation illustrated in FIG. 4. As a result, the main program 100 is loaded again from the nonvolatile memory 40 into the volatile memory 30.

In addition, after the end command is transmitted from the investigation PC 3 to the magnetic disk device 1, the user may shut off power supply to the magnetic disk device 1 to power off the magnetic disk device 1.

According to the embodiment described above, the main program 100a, the analysis program 200a, and the digital signature 201a are loaded into the volatile memory 30 (RAM 16) serving as a first memory. The signature check program 300 and the public key 202 are stored in the mask ROM 17 or the OTP 18 serving as a second memory. In response to occurrence of an interrupt during the execution of the main program 100a, the CPU 12 verifies the analysis program 200a one the basis of the digital signature 201a and the public key 202, in accordance with the signature check program 300. After finding the result of the verification as a pass, the CPU 12 analyzes the main program 100a by the analysis program 200a. After finding the result of the verification as a fail, the CPU 12 refrains from analyzing the main program 100a. Thus, the CPU 12 can securely verify the analysis program 200a and analyze the main program 100a.

As a comparison (referred to as Comparative Example 1) with the embodiment, a technique of loading an analysis program and a digital signature into a volatile memory upon power-on of a magnetic disk device is available. For example, the analysis program can be included in a main program and the digital signature can be generated from the main program including the analysis program. In Comparative Example 1, the analysis program and the digital signature are actually used a long time after the analysis program and the digital signature are loaded into the volatile memory. In such a long period, thus, the analysis program in the volatile memory may possibly be tampered with or the analysis program may be destroyed due to runaway of the main program.

To the contrary, according to the embodiment, the analysis program 200 is loaded from the nonvolatile memory 40, serving as a third memory, into the volatile memory 30 when the analysis of the main program 100a is required. Thus, the analysis program 200a can be used more securely than in Comparative Example 1.

Furthermore, the analysis program 200 and the digital signature 201 are stored in the rewritable nonvolatile memory 40. For example, after shipment of the magnetic disk device 1, the manufacturer creates a new pair of analysis program 200 and digital signature 201. The user can update the pair of analysis program 200 and digital signature 201 stored in the nonvolatile memory 40 to a new one. The manufacturer newly creates the analysis program 200 and the digital signature 201 using the same secret key used before. Thereby, it is possible for the user to use the public key 202 inside the OTP 18 for verification irrespective of the update of the analysis program 200 and the digital signature 201.

According to the embodiment, the CPU 12 is configured to identify the location of the signature check program 300 in the mask ROM serving as a fourth memory, referring to the address value stored in the OTP 18 serving as a fifth memory.

Identifying the location of the signature check program 300 from the address value 400 stored in the non-rewritable nonvolatile memory makes it possible to securely initiate the signature check program 300. This makes it extremely difficult to compromise the magnetic disk device 1 by, for example, booting an unauthorized program in response to an interrupt request.

The CPU 12 may not directly acquire the address value 400 from the OTP 18 after receiving the interrupt request. For example, the CPU 12 loads the address value 400 from the OTP 18 into the volatile memory 30 as a vector table at given timing. Receiving the interrupt request, the CPU 12 may identify the location of the signature check program 300 referring to the vector table in the volatile memory 30.

In addition, according to the embodiment, the signature check program 300 is stored in the mask ROM 17. The public key 202 is stored in the OTP 18 after manufacture of the hardware of the magnetic disk device 1. Storage of the digital signature 201 in the nonvolatile memory 40 makes it easier to set different combinations of the public keys 202 and the digital signatures 201 for magnetic disk devices.

The locations of the signature check program 300 and the public key 202 are not limited to the examples described above. The signature check program 300 and the public key 202 may be stored together in the mask ROM 17, for example.

In addition, according to the embodiment, the main program 100 or 100a serving as a first program includes firmware that causes the CPU 12 to execute access control over the magnetic disk 24 in response to a request from the host 2. A subject of the analysis is, however, not limited to firmware. Any computer program may be a subject of the analysis by the analysis program 200.

First Modification

The above embodiment has described the example that the CPU 12 identifies the location of the signature check program 300 referring to the address value 400 stored in the OTP 18. A method of identifying the location of the signature check program 300 is not limited thereto. According to a modification of the identifying method of the location of the signature check program 300, the location of the signature check program 300 is identified through bank switching.

Figure 7:
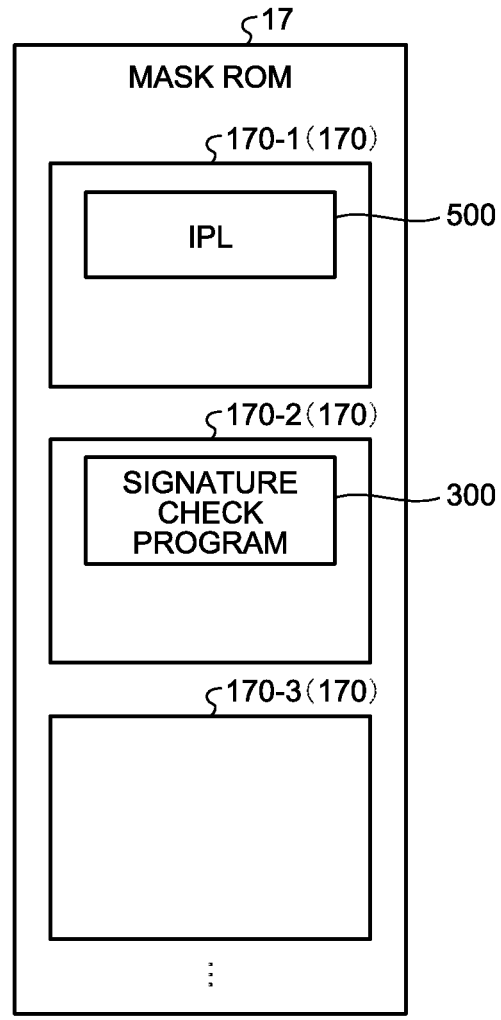
FIG. 7 is a schematic diagram illustrating a configuration of a mask read only memory (ROM) according to a first modification of the embodiment.

FIG. 7 is a schematic diagram illustrating a configuration of mask ROM 17 according to a first modification of the embodiment. The mask ROM 17 is divided into a plurality of banks 170. FIG. 7 illustrates three banks 170-1, 170-2, and 170-3 of the banks 170. The number of banks 170 may be set to two or four or more. The first bank 170-1 contains an IPL 500 at the head. The second bank 170-2 contains a signature check program 300 at the head.

At the time of power-on of the magnetic disk device 1, the CPU 12 starts operating in accordance with the stored IPL 500, by shifting control to the head of the first bank 170-1. After receiving an interrupt request, the CPU 12 performs bank switching of the mask ROM 17. By shifting the control to the head of the second bank 170-2, the CPU 12 starts operating by the stored signature check program 300.

In this manner, the CPU 12 can initiate the signature check program 300 through bank switching of the banks of the mask ROM 17. Use of the mask ROM 17 leads to eliminating the necessity to write the address value 400 indicating the location of the signature check program 300 to the OTP 18.

Second Modification

The above embodiment has described the example that the interrupt controller 15 generates the interrupt request in response to the connection of the investigation PC 3, and the CPU 12 initiates the signature check program 300, triggered by the interrupt request. The trigger for initiating the signature check program 300 is not limited to such an example.

Figure 8:
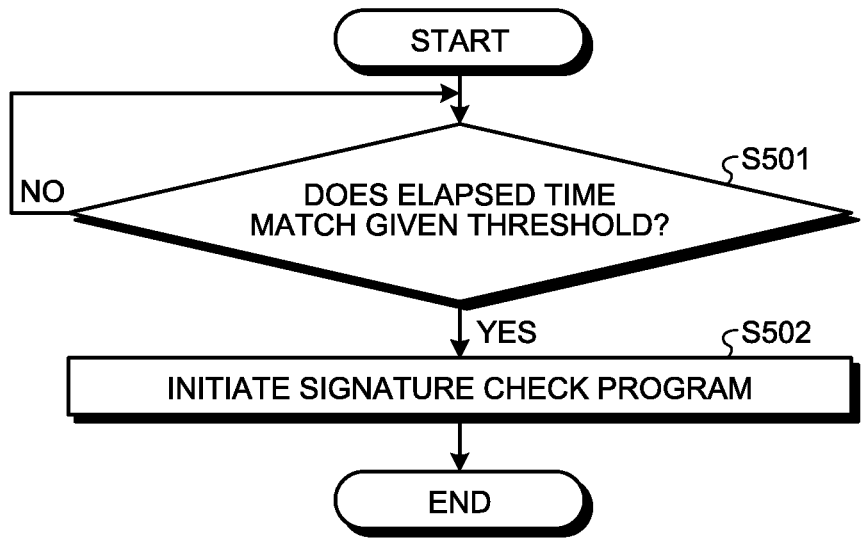
FIG. 8 is a flowchart illustrating an initiation method according to a second modification of the embodiment.

FIG. 8 is a flowchart illustrating an initiation method according to a second modification of the embodiment. The CPU 12 determines whether or not an elapsed time from power-on of the magnetic disk device 1 or from previous execution of the signature check program 300 matches a given threshold (S501). After determining that the elapsed time does not match with the given threshold (No in S501), the CPU 12 executes the operation of S501 again. After determining that the elapsed time matches with the given threshold (Yes in S501), the CPU 12 initiates the signature check program 300 (S502) and ends the operation.

The investigation PC 3 may or may not be connected to the UART 14. If the investigation PC 3 is connected to the UART 14, the CPU 12 may execute the series of operations illustrated in FIG. 6 in S502.

If the investigation PC 3 is not connected to the UART 14, the CPU 12 may execute the series of operations illustrated in FIG. 6 in S502. However, after finding the result of the verification of the analysis program 200a as a pass, the CPU 12 performs the analysis in S406 without receipt of a command from the investigation PC 3. For example, the CPU 12 can automatically collect the contents of the volatile memory 30 or the log 600 of the nonvolatile memory 40 in accordance with the analysis program 200a, to perform the analysis on the basis of the collected information. The CPU 12 does not transmit the collected information to the investigation PC 3. Upon completion of the analysis, the CPU 12 can execute the operation of S408 without receipt of an end command.

FIG. 9 is a flowchart illustrating another initiation method according to a second modification of the embodiment. The CPU 12 determines whether or not an amount of accesses to the magnetic disk 24 from power-on of the magnetic disk device 1 or from previous execution of the signature check program 300 matches with a given threshold (S601).

The amount of writing or reading may be counted as the amount of accesses. Alternatively, the total amount of writing and reading may be counted. The amount of accesses may be represented by data size or the number of commands.

After determining that the amount of accesses does not match with the given threshold (No in S601), the CPU 12 executes the operation of S601 again. After determining that the amount of accesses matches with the given threshold (Yes in S601), the CPU 12 initiates the signature check program 300 (S602) and ends the operation. An example of the initiation of S602 is similar to S502 described with reference to FIG. 8.

In this manner, the CPU 12 may execute the signature check program 300 every time a preset time period elapses. Alternatively, the CPU 12 may execute the signature check program 300 every time the amount of accesses to the magnetic disk 24 reaches a preset value.

According to the embodiment and the first and second modifications, upon satisfaction of a certain condition during execution of the first program, the processor verifies the second program on the basis of the digital signature in the first memory and the public key in the second memory, in accordance with the third program. After finding a result of the verification as a pass, the processor analyzes the first program in the first memory in accordance with the second program in the first memory. The processor refrains from analyzing the first program in accordance with the second program, after finding the result of the verification as a fail. Thereby, the processor can securely analyze the first program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a first interface connected to a host;
a second interface connected to an investigation computer;
an interrupt controller configured to generate an interrupt request in response to connection of the investigation computer to the second interface;
a first memory, the first memory being a volatile memory into which a first program, a second program, and a digital signature for the second program are loaded, the second program and the digital signature being loaded from a third memory of the information processing device, and the third memory being a rewritable and nonvolatile memory that stores the second program and the digital signature;
a second memory, the second memory being a non-rewritable and nonvolatile memory that stores a third program and a public key, the second memory including a fourth memory and a fifth memory different from the fourth memory, the fourth memory storing the third program, and the fifth memory storing an address value indicating a location of the third program in the fourth memory; and
a processor configured to:
start execution of the first program;
receive, from the interrupt controller, the interrupt request during the execution of the first program;
in response to receiving the interrupt request during the execution of the first program, suspend the execution of the first program and maintain the first program in a suspended state, identify the location of the third program, referring to the address value stored in the fifth memory, and verify, in accordance with the third program, the second program based on the digital signature and the public key;
when a result of a verification of the second program is found to be a pass, analyze, in accordance with the second program, the first program maintained in the suspended state, and then resume the execution of the first program from a point at which the execution of the first program was suspended; and
when the result of the verification is found to be a fail, refrain from analyzing the first program maintained in the suspended state, and then resume the execution of the first program from the point at which the execution of the first program was suspended.

2. The information processing device according to claim 1, wherein the processor loads the second program and the digital signature from the third memory into the first memory in accordance with the third program, in response to the interrupt request.

3. The information processing device according to claim 1, wherein:
the second memory comprises a first bank that stores an initial program loader at a head of the first bank, and a second bank that stores the third program at a head of the second bank, and
the processor is configured to load the first program in accordance with the initial program loader at a time of power-on, and execute the third program in response to the interrupt request.

4. The information processing device according to claim 2, wherein:
the second memory comprises a first bank that stores an initial program loader at a head of the first bank, and a second bank that stores the third program at a head of the second bank, and
the processor is configured to load the first program in accordance with the initial program loader at a time of power-on, and execute the third program in response to the interrupt request.

5. The information processing device according to claim 1, wherein:
the second memory includes a mask read only memory and a one-time programmable memory,
the third program is stored in the mask read only memory, and
the public key is stored in the one-time programmable memory.

6. The information processing device according to claim 2, wherein:
the second memory includes a mask read only memory and a one-time programmable memory,
the third program is stored in the mask read only memory, and
the public key is stored in the one-time programmable memory.

7. The information processing device according to claim 1, further comprising a magnetic disk,
wherein the first program includes firmware that causes the processor to execute access control over the magnetic disk in response to a request from the host.

8. The information processing device according to claim 2, further comprising a magnetic disk,
wherein the first program includes firmware that causes the processor to execute access control over the magnetic disk in response to a request from the host.

9. The information processing device according to claim 3, further comprising a magnetic disk,
wherein the first program includes firmware that causes the processor to execute access control over the magnetic disk in response to a request from the host.

10. The information processing device according to claim 4, further comprising a magnetic disk,
wherein the first program includes firmware that causes the processor to execute access control over the magnetic disk in response to a request from the host.

11. The information processing device according to claim 5, further comprising a magnetic disk,
wherein the first program includes firmware that causes the processor to execute access control over the magnetic disk in response to a request from the host.

12. The information processing device according to claim 6, further comprising a magnetic disk,
wherein the first program includes firmware that causes the processor to execute access control over the magnetic disk in response to a request from the host.

13. The information processing device according to claim 1, wherein the processor is configured to analyze, in accordance with the second program, the first program maintained in the suspended state by collecting a log recorded during the execution of the first program or collecting the first program loaded in the first memory.

14. An information processing device comprising:
a first interface connected to a host;
a second interface connected to an investigation computer;
an interrupt controller configured to generate an interrupt request in response to connection of the investigation computer to the second interface;
a first memory, the first memory being a volatile memory into which a first program, a second program, and a digital signature for the second program are loaded, the second program and the digital signature being loaded from a third memory of the information processing device, and the third memory being a rewritable and nonvolatile memory that stores the second program and the digital signature;
a second memory, the second memory being a non-rewritable and nonvolatile memory that stores a third program and a public key, and the second memory comprising (i) a first bank that stores an initial program loader at a head of the first bank and (ii) a second bank that stores the third program at a head of the second bank; and
a processor configured to:
load the first program in accordance with the initial program loader at a time of power-on;
start execution of the first program;
receive, from the interrupt controller, the interrupt request during the execution of the first program;
in response to receiving the interrupt request during the execution of the first program, suspend the execution of the first program and maintain the first program in a suspended state, execute the third program stored at the head of the second bank, and verify, in accordance with the third program, the second program based on the digital signature and the public key;
when a result of a verification of the second program is found to be a pass, analyze, in accordance with the second program, the first program maintained in the suspended state, and then resume the execution of the first program from a point at which the execution of the first program was suspended; and
when the result of the verification is found to be a fail, refrain from analyzing the first program maintained in the suspended state, and then resume the execution of the first program from the point at which the execution of the first program was suspended.

15. The information processing device according to claim 14, wherein the processor loads the second program and the digital signature from the third memory into the first memory in accordance with the third program, in response to the interrupt request.

16. The information processing device according to claim 14, wherein:
the second memory includes a fourth memory and a fifth memory different from the fourth memory,
the fourth memory stores the third program,
the fifth memory stores an address value indicating a location of the third program in the fourth memory, and
in response to the interrupt request, the processor identifies the location of the third program, referring to the address value stored in the fifth memory.

17. The information processing device according to claim 14, wherein:
the second memory includes a mask read only memory and a one-time programmable memory,
the third program is stored in the mask read only memory, and the public key is stored in the one-time programmable memory.

\* \* \* \* \*